United States Patent [19]

Suga

[11] Patent Number: 5,762,392

[45] Date of Patent: Jun. 9, 1998

[54] COLLISION ENERGY ABSORBING STRUCTURE BY VEHICLE INTERIOR TRIM MATERIAL

[75] Inventor: Hitoshi Suga, Nagoya, Japan

[73] Assignee: Toyota Jidosha Kabushiki Kaisha, Japan

[21] Appl. No.: 676,626

[22] Filed: Jul. 10, 1996

[30] Foreign Application Priority Data

Jul. 12, 1995 [JP] Japan ................................. 7-197926

[51] Int. Cl.⁶ .................................................. B60R 21/04
[52] U.S. Cl. .................... 296/39.1; 296/189; 280/751; 188/376; 293/133
[58] Field of Search ..................... 296/188, 189, 296/39.1, 203, 146.6, 146.7; 280/748, 751, 752; 188/371, 375, 376; 267/140, 141; 293/120, 121, 133, 136

[56] References Cited

U.S. PATENT DOCUMENTS

| | | | |
|---|---|---|---|
| 1,628,090 | 5/1927 | Weiss | 267/141 X |
| 3,026,224 | 3/1962 | Rogers, Jr. | |
| 3,049,344 | 8/1962 | Hawkins | 267/141 |
| 3,587,787 | 6/1971 | Rich et al. | 188/375 |
| 3,638,992 | 2/1972 | Forshee | |
| 3,779,595 | 12/1973 | Suzuki et al. | |
| 3,871,636 | 3/1975 | Boyle | 267/140 |
| 3,930,665 | 1/1976 | Ikawa | |
| 3,997,207 | 12/1976 | Norlin | 267/140 |
| 4,165,113 | 8/1979 | Casse | 293/121 |
| 4,373,665 | 2/1983 | Dietzsch | 280/752 X |
| 4,696,401 | 9/1987 | Wallace | 206/594 |
| 4,786,540 | 11/1988 | Bruhnke | 428/71 |
| 4,822,011 | 4/1989 | Goldbach et al. | 267/201 |
| 4,925,224 | 5/1990 | Smiszek | 293/120 |
| 5,046,777 | 9/1991 | Garnweidner et al. | 296/189 |
| 5,163,730 | 11/1992 | Welch | 296/189 |
| 5,306,066 | 4/1994 | Saathoff | 296/189 X |
| 5,382,051 | 1/1995 | Glance | 280/751 |
| 5,507,540 | 4/1996 | Pernot | 293/136 X |
| 5,531,499 | 7/1996 | Vecchio et al. | 296/146.7 |
| 5,573,272 | 11/1996 | Teshima | 296/146.6 X |

FOREIGN PATENT DOCUMENTS

| | | | |
|---|---|---|---|
| 1045183 | 12/1978 | Canada. | |
| 067819 | 3/1958 | France. | |
| 1909252 | 1/1965 | Germany. | |
| 3740687 | 8/1989 | Germany. | |
| 40 15375 | 11/1991 | Germany. | |
| 172848 | 10/1982 | Japan | 293/120 |
| 4-42450 | 4/1992 | Japan. | |
| 4-42451 | 4/1992 | Japan. | |
| 4-42452 | 4/1992 | Japan. | |
| 4-125953 | 11/1992 | Japan. | |
| 5-19010 | 3/1993 | Japan. | |
| 7-117596 | 9/1994 | Japan. | |
| 6-247199 | 5/1995 | Japan. | |
| 7-117596 | 5/1996 | Japan. | |
| 8-119047 | 5/1996 | Japan. | |

*Primary Examiner*—Dennis H. Pedder
*Attorney, Agent, or Firm*—Cushman Darby & Cushman Intellectual Property Group of Pillsbury Madison & Sutro, LLP

[57] ABSTRACT

A collision energy absorbing structure of an automobile is provided with an energy absorbing space between an inner panel of a vehicle structure member and an interior trim material covering the inner panel in the inward thereof and has a grid-like non-metal energy absorber (10) disposed within the energy absorbing space, the energy absorber (10) including one or a plurality of longitudinal ribs (32) and a plurality of lateral ribs (34). Each longitudinal rib (32) of the energy absorber has notches (36) on the inward side confronting the interior trim material directed toward a junction (33) where each longitudinal rib intersects each lateral rib and joined together.

6 Claims, 5 Drawing Sheets

COLLISION ENERGY ABSORBING STRUCTURE BY VEHICLE INTERIOR TRIM MATERIAL

BACKGROUND OF THE INVENTION

1. Field of the Invention

This invention relates to a collision energy absorbing structure by utilizing a non-metal interior trim material disposed in the inward of a panel of a vehicle body structure member, and more particularly to a structure for absorbing and relieving a collision energy caused by a structure member, such as a front pillar, a center pillar, a rear pillar or a roof side rail of the vehicle body, by means of deformation of an energy absorber disposed between an interior trim material such as a pillar garnish or a roof side garnish and the structure member as well as deformation of the interior trim material.

2. Description of the Related Art

A collision energy absorbing structure provided with an energy absorbing space between an inner panel of a structure member such as a front pillar of an automobile and an interior trim material such as a pillar garnish disposed in the inward of the inner panel, and also with a grid-like resin energy absorber consisting of longitudinal rib or ribs and lateral ribs disposed in the energy absorbing space has been proposed (JP Patent Application No. 7-23307).

SUMMARY OF THE INVENTION

According to the collision energy absorbing structure relative to the foregoing proposal, it is intended to absorb a collision energy mainly by buckling the longitudinal ribs or the lateral ribs. However, if a collision energy is absorbed by buckling the longitudinal or lateral ribs, non-crushed portions may be caused by folding up of ribs, which reduces the amount of displacement for energy absorbing. Also, since portions to be buckled vary, an energy absorbing characteristic tends to be unstable.

The present invention provides a structure for absorbing a collision energy of an automobile, by shearing longitudinal rib or ribs or lateral ribs of a grid-like energy absorber and thereby reducing non-crushed portions of the ribs.

The present invention further provides a structure for absorbing a collision energy, which can stabilize an energy absorbability.

The present invention is a collision energy absorbing structure of an automobile, comprising an energy absorbing space provided between an inner panel of a structure member having the inner panel and an outer panel and an interior trim material covering the inner panel inward thereof and a grid-like non-metal energy absorber disposed within the energy absorbing space, the energy absorber including one or a plurality of longitudinal ribs and a plurality of lateral ribs. One of the longitudinal ribs and the lateral ribs of the energy absorber has means capable of shearing itself when collision energy is exerted to the interior trim material.

In one aspect of the present invention, the means capable of shearing itself are notches provided on at least the inward side of the one of the longitudinal ribs and the lateral ribs of the energy absorber confronting the interior trim material. The notches are directed toward joint portions where each of the longitudinal ribs and each of the lateral ribs intersect and are joined together. In another aspect of the present invention, the means are the longitudinal ribs of the energy absorber disposed substantially at right angles to the interior trim material and formed thinner than the lateral ribs.

In case the means are notches, the one of the ribs having the notches are preferably the longitudinal ribs and may have a cut portion in an intermediate position between the joint portions on the outward side confronting the inner panel or on the inward side confronting the interior trim material, while the lateral ribs may be inclined to the inner panel and the interior trim material.

The energy absorbing space can be set at 10–30 mm. The grid-like energy absorber molded by injection molding from a hard synthetic resin such as polypropylene or a collision-resistant resin (e.g., TSOP-YK3 manufactured by Mitsubishi Yuka). The longitudinal ribs and the lateral ribs of the energy absorber can be arranged at a pitch of 15–30 mm respectively, and the thickness of the ribs can be set at 1–2 mm. A notch provided in each longitudinal rib or lateral rib preferably includes a tip end so that a stress concentration can easily occur, and the depth thereof may be 1 mm or so. The energy absorber and the interior trim material are preferably molded independently and joined by a clip or the like.

When a collision load in the outward direction of the vehicle chamber acts on the interior trim material, the interior trim material is deformed, whereby the collision load is transmitted to the energy absorber. In the energy absorber, a stress concentration based on the collision load occurs in the notches, whereby one of the ribs is sheared and the other of the ribs fall down to absorb the collision energy.

Since one of the ribs is sheared and the other of the ribs fall down by bending deformation or buckling deformation, non-crushed portions due to the folding up of the ribs are reduced. As a result, the amount of displacement of the energy absorber increases to enhance the collision energy absorbability. Also, since one of the ribs has notches, a position to be sheared becomes constant, thereby stabilizing the energy absorbing characteristic.

In case the ribs having the notches are the longitudinal ribs, the following effect is obtained in addition to the foregoing effects. The number of the lateral ribs is greater than that of the longitudinal ribs so that the lateral ribs receive a collision load from every direction. In this case, it is surer to have the lateral ribs fall down by shearing the longitudinal ribs which are fewer in number than to have the longitudinal ribs fall down by shearing the lateral ribs which are more in number. Thus, the collision energy can be absorbed effectively by enhancing the sureness in absorbing a collision load when the collision load is exerted from any direction.

In case the ribs having the notches have cut portions, the following effect is obtained in addition to the foregoing effects. Since one of the ribs having the notches has a cut portion in an intermediate position between the junctions, a shearing is more liable to occur, thereby reducing non-crushed portions of the other of the ribs.

In case the lateral ribs are inclined, the following effect is obtained in addition to the foregoing effects. Being inclined to the inner panel and the interior trim material, the lateral ribs are liable to be sheared. And since a collision energy is absorbed by the shearing of the longitudinal and lateral ribs, an ideal load-stroke characteristic can be easily and stably obtained.

In case the energy absorber is formed independently of the interior trim material, the following effect is obtained in addition to the foregoing effects. Being formed independently of the interior trim material, the energy absorber can be molded accurately, and a stable collision energy absorbing effect can be displayed.

In case the means capable of shearing are longitudinal ribs, when a collision load in the outward direction of the vehicle chamber acts on the interior trim material, the interior trim material is deformed, and by which the collision load is transmitted to the energy absorber. Since in the energy absorber the longitudinal ribs intersect the interior trim material substantially at right angles, a great stress due to the collision load is generated in the longitudinal ribs, and being thin, the longitudinal ribs are sheared, and the lateral ribs fall down, thereby absorbing the collision energy.

Since the longitudinal ribs are sheared and the lateral ribs undergo bending deformation or buckling deformation to fall down, non-crushed portions due to folding up of the ribs are reduced. As a result, the amount of displacement of the energy absorber increases, thereby enhancing the collision energy absorbability.

The lateral ribs, which are more in number than the longitudinal ribs, receive a collision load from any direction. In this case, it is surer to cause the lateral ribs to fall down by shearing the longitudinal ribs which are fewer in number than to cause the longitudinal ribs to fall down by shearing the lateral ribs which are more in number. According to the invention, however, since the longitudinal ribs are sheared, the collision energy can be effectively absorbed while enhancing the sureness of the collision energy absorption, from whichever direction the collision load is exerted.

DESCRIPTION OF THE PREFERRED EMBODIMENTS

Figure 4:
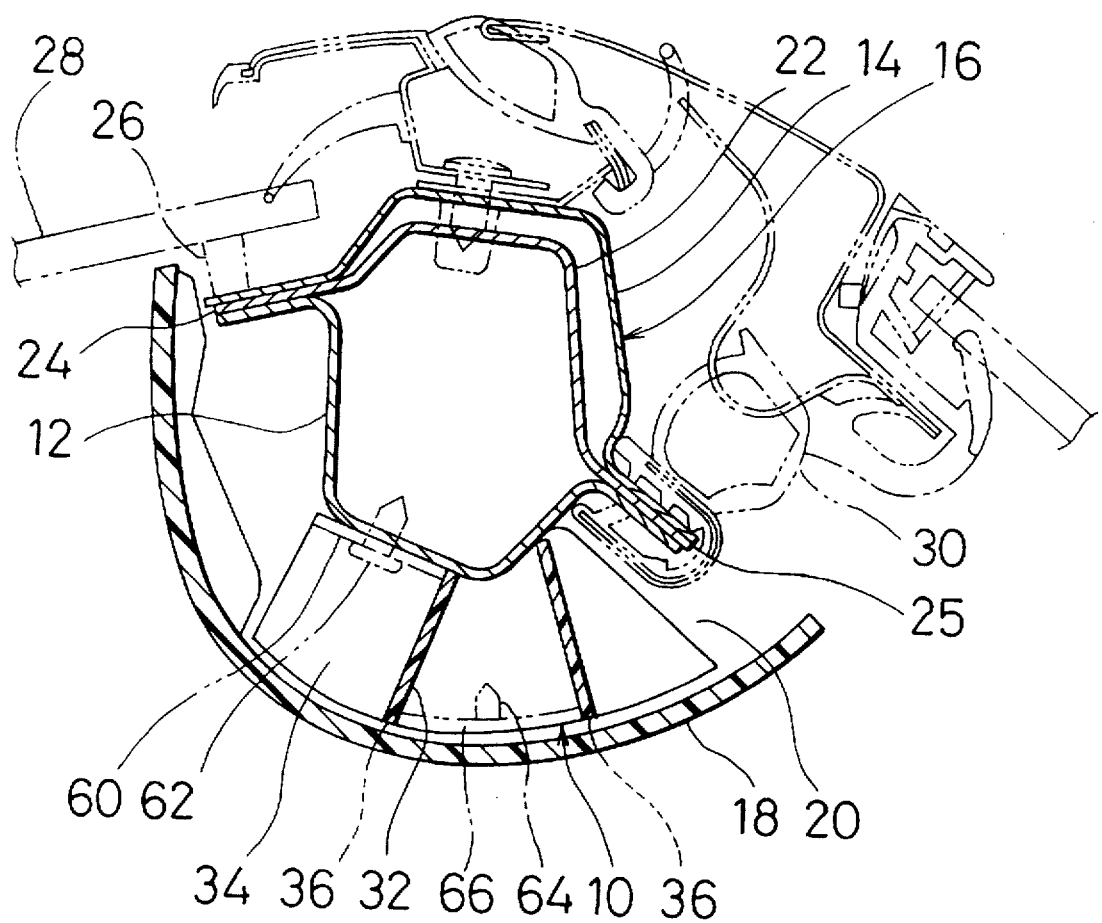
FIG. 4 is a cross sectional view showing a state where the collision energy absorbing structure of an automobile relative to the present invention is attached to a predetermined position.

An energy absorber 10 is, with reference to FIG. 4 showing a state of its cross section, disposed within an energy absorbing space 20 provided between an inner panel 12 of a front pillar 16, which is the structure member of a vehicle body having the inner panel 12 and an outer panel 14, and a pillar garnish 18, which is the interior trim material covering the inner panel 12 in the inward thereof. A collision energy is absorbed by the pillar garnish 18 and the energy absorber 10.

The front pillar 16 is, in the illustrated embodiment, formed interposing a reinforcing panel 22 between the inner panel 12 and the outer panel 14, with respective flanges overlapped and spot-welded, so that the horizontal section may present a closed structure. A flange connecting portion 24 in the front supports a window shield glass 28 through a sealing material 26, while a flange connecting portion 25 in the rear has an opening trim 30 attached thereto.

Figure 1A:
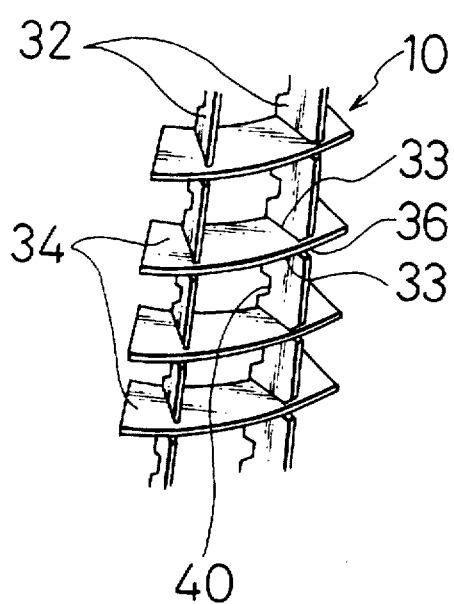
FIG. 1 partly shows an embodiment of an energy absorber to be used for a collision energy absorbing structure of an automobile relative to the present invention, wherein (a) is a perspective view, and (b) is an enlarged side view viewing (a) from the left side.
Figure 1B:
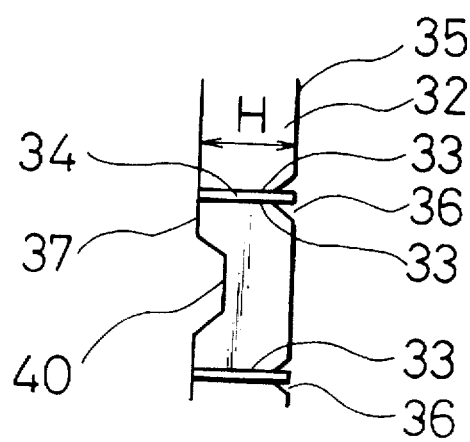

The energy absorber 10 in the embodiment of FIG. 1 showing a perspective state is a grid-like one consisting of two longitudinal ribs 32 and a plurality of lateral ribs 34 and is injection-molded independently of the pillar garnish 18 from a collision-resistant resin. The longitudinal ribs 32 extend along the longitudinal direction of the front pillar 16. On the other hand, the lateral ribs 34 extend to cross the longitudinal ribs 32 so that, when the energy absorber 10 is attached to the front pillar 16, the lateral ribs 34 may become substantially horizontal, or the lateral ribs 34 may become substantially orthogonal to the longitudinal ribs 32. As shown in FIG. 2(C), the lateral ribs 34 can be molded to incline to the longitudinal ribs 32, so that the lateral ribs 34 incline to the inner panel of the front pillar and the pillar garnish when the energy absorber 10 is attached to the front pillar.

The longitudinal ribs 32 of the energy absorber 10 have notches 36 on the inward side confronting the pillar garnish 18. The notches 36 are directed toward the junctions or joint portions 33 where each longitudinal rib 32 and each lateral rib 34 cross each other and joined together. In FIG. 1(b) showing a state of a side of the junctions 33, the notch 36 presents a triangular shape as viewed from the side. Namely, the notch 36 extends obliquely in the direction of the height H of the longitudinal rib 32 from the inward side 35 where the longitudinal rib 32 confronts the pillar garnish.

Figure 2A:
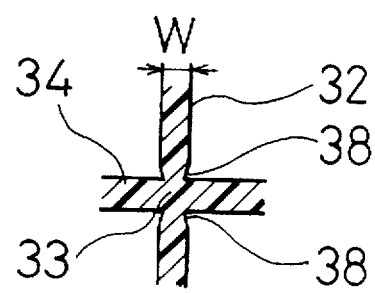
FIG. 2 partly shows three another embodiments of an energy absorber to be used for a collision energy absorbing structure of an automobile relative to the present invention, wherein (a) is a sectional front elevation showing a longitudinal rib and a lateral rib, and (b) and (c) are respectively enlarged side views similar to Fig. 1(b).
Figure 2B:
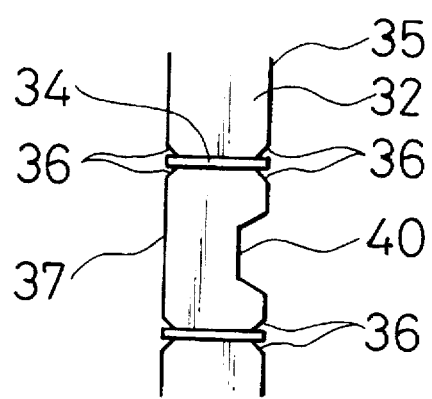
Figure 2C:
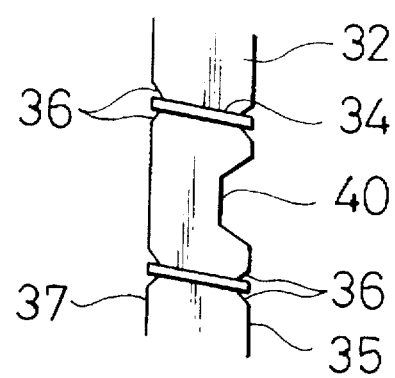

A notch 38 can be formed in a corner as shown in FIG. 2(a) showing a plan state of the junction. This notch 38 extends obliquely in the thicknesswise direction W of the longitudinal rib 32 toward the junction 33. The notch 36 can be provided as shown in FIGS. 2(b) and 2(c) not only on the inward side 35 where the longitudinal rib 32 confronts the pillar garnish but also on the outward side 37 where the front pillar confronts the inner panel. This applies to the notch 38, too. Also, in place of the longitudinal rib 32, notches can be provided in the lateral rib 34.

As shown in Fig. 1(b), the longitudinal rib 32 having the notches 36 includes a cut portion 40 in an intermediate position between the junctions on the outward side 37 confronting the inner panel. The cut portion 40 can be, as shown in FIGS. 2(b) and 2(c), provided in an intermediate position between the junctions on the inner side 35 of the longitudinal rib 32 confronting the pillar garnish. Also, in the case of providing notches in the lateral rib 34, the cut portion can be provided in an intermediate position between the junctions of the lateral rib.

Figure 3:
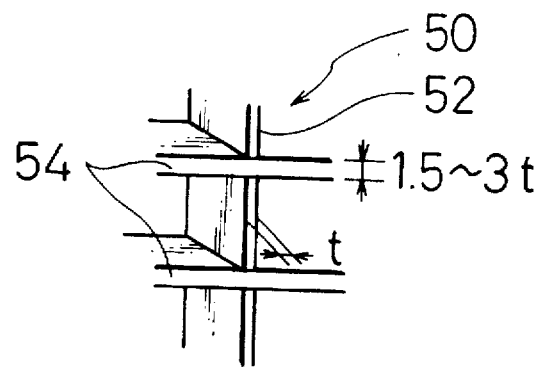
FIG. 3 is a perspective view partly showing a further embodiment of the energy absorber to be used for the collision energy absorbing structure of an automobile relative to the present invention.

In the foregoing embodiment, besides making the thickness of the longitudinal rib 32 substantially equal to that of the lateral rib 34, the notches are provided in either one of the ribs. It is intended by this that, when a collision load acts, a stress concentration is caused to the notch, and that a shearing is caused by this stress concentration. In the embodiment in place thereof shown in FIG. 3, an energy absorber 50 consists of one or a plurality of longitudinal ribs 52 and a plurality of lateral ribs 54 formed like a grid, the longitudinal ribs 52 being formed thinner than the lateral ribs 54. In this case, the ratio of the thickness of the longitudinal ribs 52 to that of the lateral ribs 54 can be set at 1:1.5~3. The longitudinal rib 52 of the energy absorber 50 is formed to intersect the pillar garnish substantially at right angles when the energy absorber 50 is attached to the front pillar. As a result, a stress based on the collision load acting from the pillar garnish becomes great and liable to shear the longitudinal rib 52.

The energy absorber 10 (the same applies to the energy absorber 50) can be attached to the inner panel 12 as shown in FIG. 4 by inserting a clip 62 from a fixing seat 60 crossing over the lateral ribs 34 into the inner panel 12. Also, the pillar garnish 18 is attached to the energy absorber 10 by inserting a clip 64 integrally provided on the outer surface of the pillar garnish 18 into the fixing seat 66 crossing over the lateral ribs 34 of the energy absorber 10.

Figure 5:
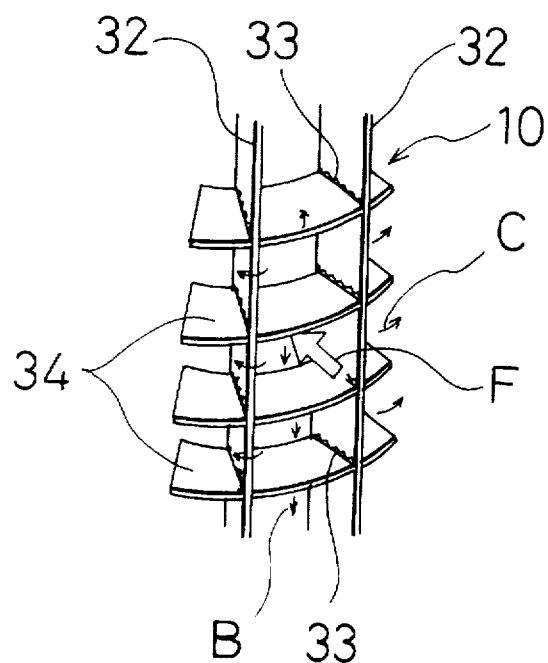
FIG. 5 is a perspective view showing a function of the energy absorber to be used for a collision energy absorbing structure of an automobile relative to the present invention.

As shown in FIG. 5, when a collision load F acts from the pillar garnish, the longitudinal ribs 32 are sheared at the junctions 33, the lateral ribs 34 fall down as indicated by B, and the longitudinal ribs 32 also fall down as indicated by C, thereby absorbing the collision energy.

Figure 6:
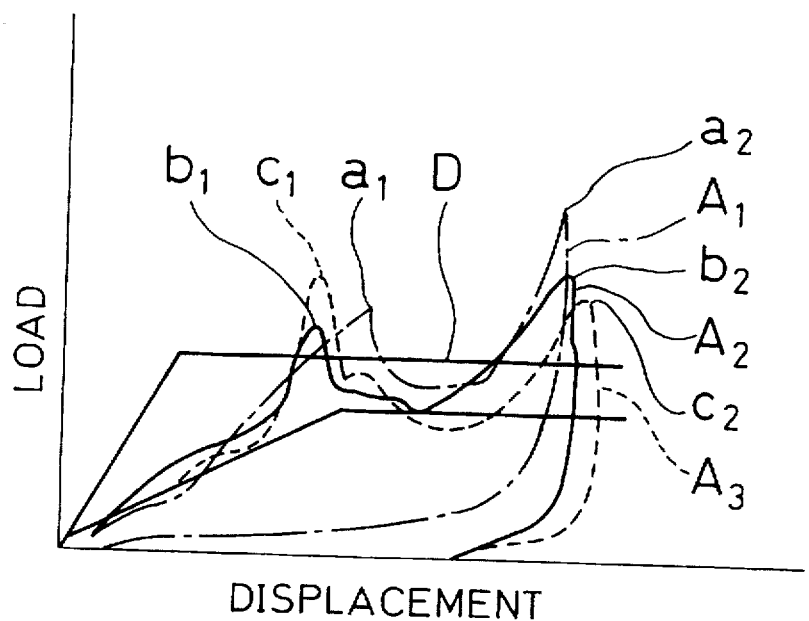
FIG. 6 is a characteristic diagram between a load and a displacement showing a result of experiments.

The result of the experiment carried out by making the size of the energy absorbing space 20 mm and disposing the energy absorber 10 molded by a collision-resistant resin within the energy absorbing space is shown in FIG. 6. With an energy absorber $A_1$ having neither a notch nor a cut portion, peak values $a_1$, $a_2$ of a load are generated respectively at corresponding displacements, while with an energy absorber $A_2$ having a notch and a cut portion, peak values $b_1$, $b_2$ of the load are generated respectively at corresponding displacements. And with an energy absorber $A_3$ having a notch only, peak values $c_1$, $c_2$ of the load are generated respectively at corresponding displacements. As apparent from this characteristic diagram, the peak values of the energy absorber $A_2$ having both the notch and the cut portion and the energy absorber $A_3$ having the notch only are lower than that of the energy absorber $A_1$ having neither a notch nor a cut portion, the characteristic as a whole being close to an ideal characteristic D. Further, the initial peak value $b_1$ of the energy absorber $A_2$ having both the notch and the cut portion is lower than the initial peak value $c_1$ of the energy absorber $A_2$ having the notch only.

Figure 7:
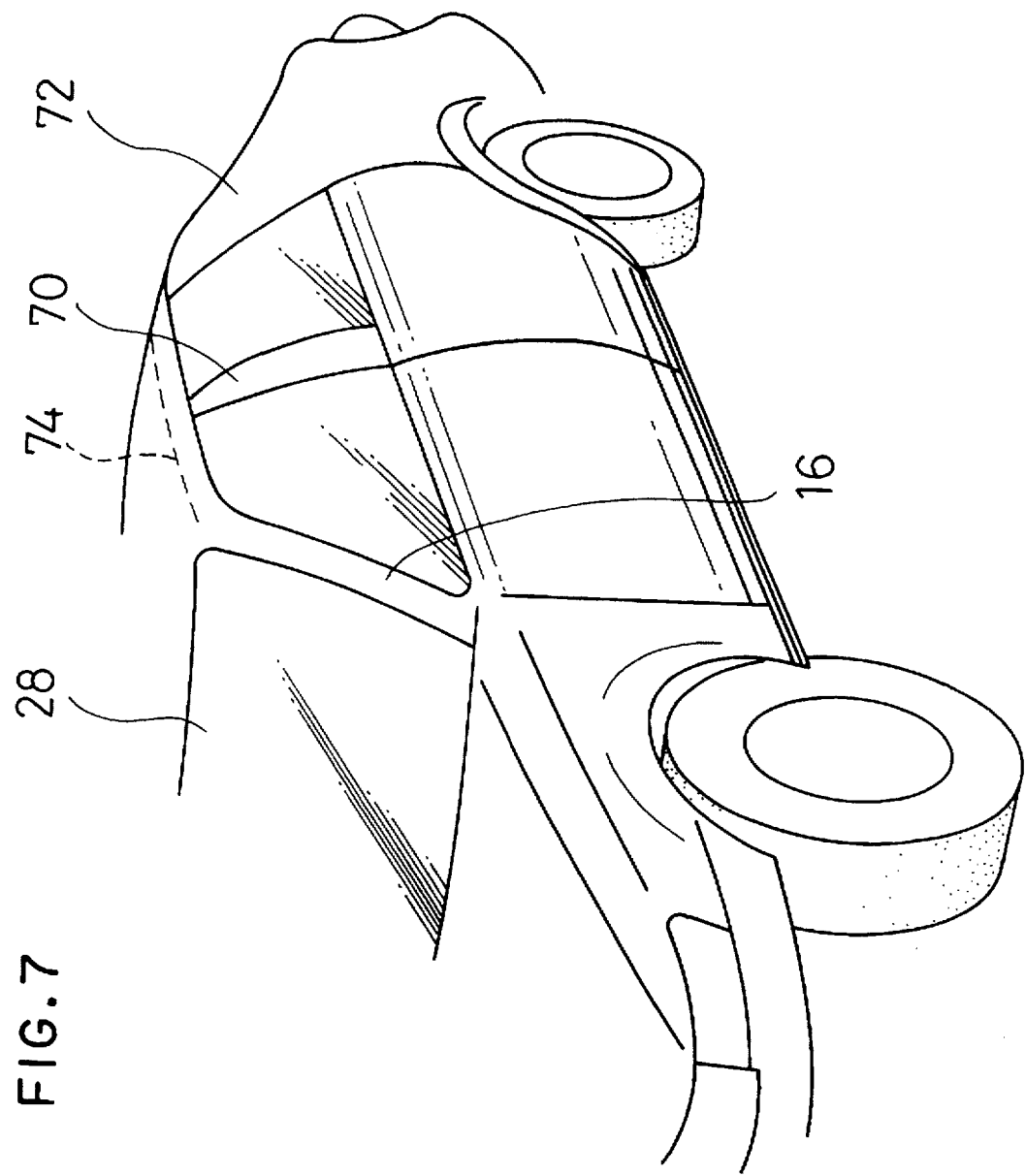
FIG. 7 is a perspective view partly showing an automobile to which the collision energy absorbing structure of an automobile relative to the present invention is applicable.

In the foregoing embodiment, the structure member is the front pillar. As shown in FIG. 7, there are such structure members in an automobile as a center pillar 70, a rear pillar 72 and a roof side rail 74. It is possible to absorb a collision energy by applying the present invention to such structure members.

What is claimed is:

1. A collision energy absorbing structure of an automobile, comprising:

a structure member having an inner panel and an outer panel, said structure member being one of a pillar and a roof side rail;

an energy absorbing space provided between the inner panel of said structure member and an interior trim material covering an inward side of the inner panel;

a grid-like, non-metal energy absorber disposed within said energy absorbing space, said energy absorber including at least one longitudinal rib extending in a longitudinal direction of said structure member, a plurality of lateral ribs, said longitudinal rib and said lateral ribs respectively having an inward side confronting said interior material, and joint portions where said longitudinal rib and each of said lateral ribs intersect and are joined together; and means capable of shearing when collision energy is exerted to said interior trim material, said means being notches directed toward said joint portions and provided on at least said inward side of one of said longitudinal rib and said lateral ribs of said energy absorber, each of said notches extending obliquely in the direction of height of one of said longitudinal rib and said lateral ribs from said inward side, thereby forming a sharp point disposed remote from the inward side where the collision energy is applied.

2. A collision energy absorbing structure of an automobile according to claim 1, wherein said means capable of shearing includes two notches provided respectively on said inward side of the longitudinal rib, said two notches being disposed such that one is on one side of said lateral rib and the other is on the other side of said lateral rib.

3. A collision energy absorbing structure of an automobile according to claim 1, wherein said longitudinal rib and said lateral ribs respectively have an outward side confronting said inner panel, and wherein said one of the ribs having said notches has a cut portion in an intermediate position between said joint portions on one of said outward side and said inward side.

4. A collision energy absorbing structure of an automobile, comprising:

a structure member having an inner panel and an outer panel, said structure member being one of a pillar and a roof side rail;

an energy absorbing space provided between the inner panel of said structure and an interior trim material covering an inward side of the inner panel;

a grid-like, non-metal energy absorber disposed within said energy absorbing space, said energy absorber including at least one longitudinal rib extending in the longitudinal direction of said structure member, a plurality of lateral ribs, said longitudinal rib and said lateral ribs respectively having an inward side confronting said interior material, and joint portions where said longitudinal rib and each of said lateral ribs intersect and are joined together; and means capable of shearing when collision energy is exerted to said interior trim material, said means being notches directed toward said joint portions and provided on said inward side of said longitudinal rib, wherein said lateral ribs of said energy absorber are inclined to the confronting portion of said inner panel and the confronting portion of said interior trim material.

5. A collision energy absorbing structure of an automobile according to any one of claims 1 or 4, wherein said energy absorber and said interior material are separate members.

6. A collision energy absorbing structure of an automobile according to claim 5, wherein said energy absorbing space is set at 10–30 mm.

* * * * *